F. C. STUCKEL.
FASTENER FOR TANK BANDS.
APPLICATION FILED AUG. 24, 1907.
923,211.
Patented June 1, 1909.
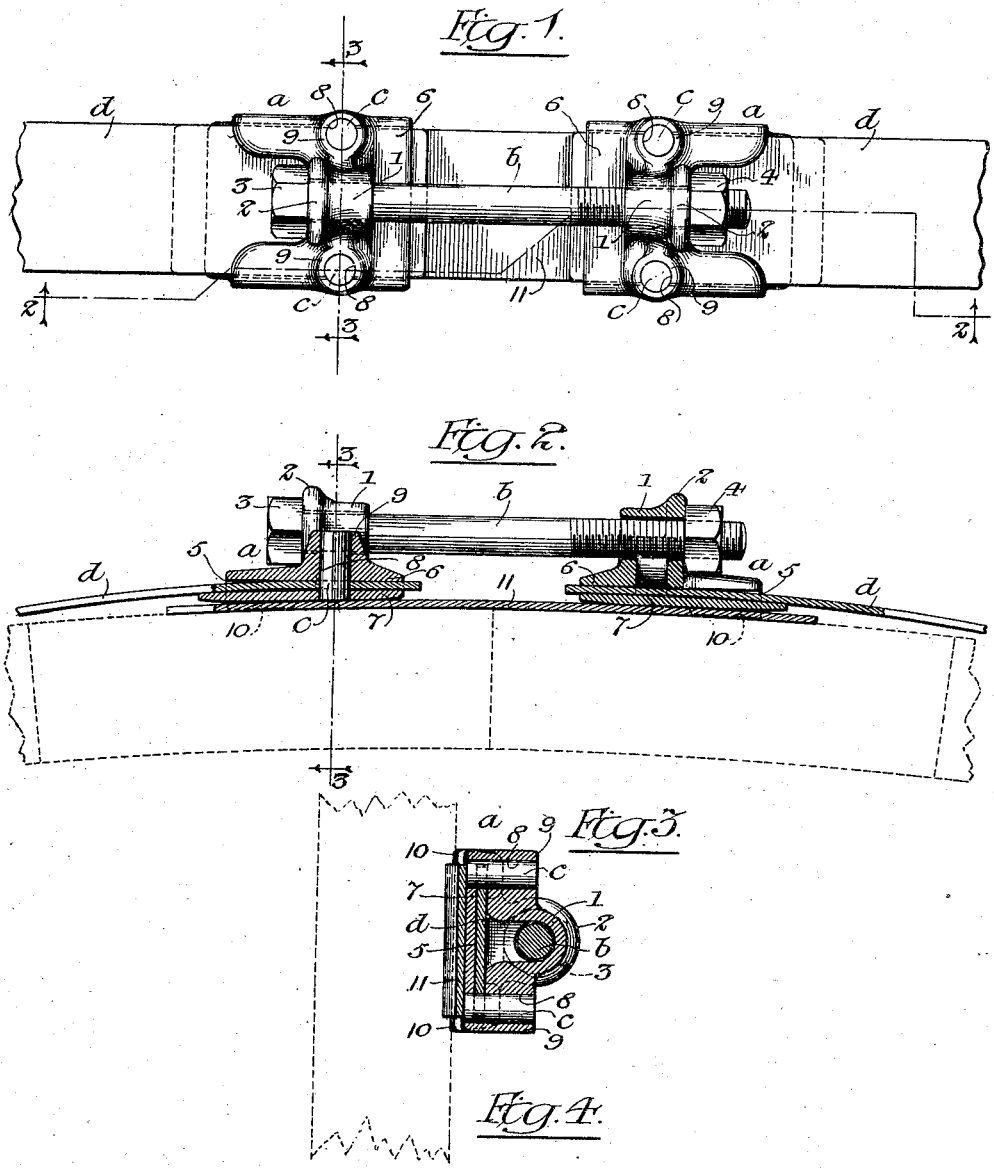
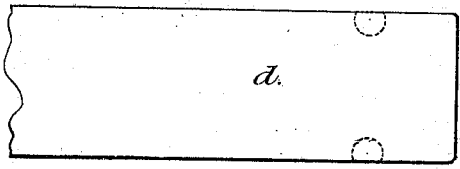

UNITED STATES PATENT OFFICE.

FRANK C. STUCKEL, OF RACINE, WISCONSIN.

FASTENER FOR TANK-BANDS.

No. 923,211. Specification of Letters Patent. Patented June 1, 1909.

Application filed August 24, 1907. Serial No. 389,963.

*To all whom it may concern:*

Be it known that I, FRANK C. STUCKEL, a citizen of the United States, and a resident of Racine, county of Racine, and State of Wisconsin, have invented certain new and useful Improvements in Fasteners for Tank-Bands, of which the following is a specification.

The improvement relates to fasteners for the hoops or bands of large tanks and seeks to provide a simple and strong construction which may be readily attached to the ends of the band without the use of special tools and with which it is unnecessary to form holes or openings in the band before attaching the fastener thereto.

The features of invention are hereinafter set forth, illustrated in the accompanying drawing and more particularly pointed out in the appended claims.

In the drawings, Figure 1 is a view in elevation of the improved fastener. Fig. 2 is a section on line 2—2 of Fig. 1. Fig. 3 is a section on lines 3—3 of Figs. 1 and 2. Fig. 4 is a detail view of one end of the band.

It has been the practice heretofore to connect the clips of the band fastener to the band by bolts and lugs engaging notches and holes in the bands, but such prior constructions have necessitated the preliminary formation of holes or openings in the bands. It has also been the practice to secure the fastening clips in place by bending or clenching over the bands on the fastener clips, but this method does not securely hold the clips against slipping on the bands.

In accordance with the present invention, the band fastener clips are provided with the usual perforated lugs for receiving the fastener bolt and are also provided with longitudinally extending, inclosed sockets for receiving the ends of the bands and with transverse holes extending through the clips and intersecting the sockets and adapted to receive hardened fastener rivets which fit the holes. The band-receiving sockets of the clips are inclosed, that is to say, the walls thereof extend on opposite sides of the flat bands and the rivet holes intersect the sockets and extend through the opposite side walls thereof so that by inserting the ends of the bands within the sockets of the clips, the latter, together with the hardened rivets, constitute mating dies for forming openings in the bands by driving the rivets into the transverse holes of the clips to secure the latter to the bands. The clips are thus readily and easily attached to the bands, a hammer being the only tool necessary, and at the same time the clips are securely held against slipping on the bands.

The preferred form of the improved fastener is illustrated in the accompanying drawing and comprises the pair of clips $a, a$, bolt $b$ and rivets $c$. The clips are provided with the central, longitudinally perforated lugs 1, for receiving the fastening bolt $b$, the lugs being provided with flanges 2 against which the head 3 and nut 4 of the belt abut. The clips are also provided with longitudinally extending, inclosed sockets 5 for receiving the ends of the flat, wrought iron band $d$. These band-receiving sockets are inclosed, that is to say, the walls thereof extend entirely around the band and the upper and lower walls 6 and 7 thereof engage the upper and lower surfaces of the band. The clips $a, a$ are also provided with transverse holes 8 for receiving the fastener rivets $c$. The holes 8 intersect the band-receiving socket 5 and extend through the upper and lower walls 6 and 7 thereof. The holes 8 are preferably arranged on opposite sides of the lugs 1 and the upper wall 6 is preferably provided with raised portions or bosses 9 through which the rivet-receiving holes 6 extend.

The hardened rivets $c$ snugly fit the holes 8 and are substantially the same length as shown. In securing the clips in place, the ends of the band are inserted in the sockets 5 of the clips and the hardened rivets driven into the holes 8 with a hammer. The construction is such that the clips constitute female dies and the hardened rivets mating punches to form openings in the band and secure the clips thereto. The hardened rivets cannot be readily headed over but, when the nut 4 on the fastener bolt $b$ is tightened, the transverse strain brought upon the rivets securely holds them against displacement within holes 8 of the clips.

The bands are usually of wrought iron and can be readily punched out in the manner described, but to facilitate the punching out of the band by means of the rivets, the holes 8 in the clips are preferably arranged to intersect the edges of the band-receiving sockets 5 so that notches are cut by the rivets in the bands, as indicated by dotted lines in Fig. 4. With the improved fastener it is unnecessary to employ any special tools for notching or cutting holes in the band since, in the manner described, the clips may be readily fastened to the ends of the bands with a hammer and are securely held by the improved construction against slipping.

The clips $a$, $a$ are preferably provided on their underside and near their outer ends with a pair of depending lugs 10 which are arranged to engage a short band section 11 which is overlapped by the ends of the band and upon which the clips may readily slide as the nut of the fastener bolt is tightened.

It is obvious that changes may be made in the details set forth without departure from the essentials of the invention as defined in the claims.

Having described my invention, what I claim as new and desire to secure by Letters Patent, is:—

1. A band-fastener comprising a pair of clips provided with perforated lugs and longitudinally extending, inclosed sockets to receive the ends of the band, said clips having transverse holes intersecting said sockets, and hardened rivets fitting said holes, said clips and rivets constituting mating dies for forming openings in the band to secure the clips thereto, and a bolt extending between the perforated lugs of said clips, substantially as described.

2. The combination of a band-fastener clip having a longitudinally extending, inclosed socket for receiving the end of the band and a transverse hole intersecting said socket, and a hardened rivet fitting the hole of said clip and forming therewith a punch and die to cut an opening in the band and secure the clip thereto, substantially as described.

3. A band-fastener comprising a pair of clips provided with longitudinally extending, inclosed sockets for receiving the ends of the band and having transverse holes intersecting and extending on opposite sides of said sockets, hardened rivets fitting said holes for cutting out portions of the band and securing the clips thereto and means for connecting said clips, substantially as described.

4. A band-fastener clip having a longitudinally perforated, bolt-receiving lug and a longitudinally extending, band-receiving socket, the walls of which extend on opposite sides of the band, the clip having transverse holes intersecting said socket and extending through the walls thereof to receive hardened fastener rivets for punching openings in the band and securing the clip thereto, substantially as described.

5. A band-fastener comprising a pair of clips having longitudinally extending, inclosed sockets for receiving the ends of flat bands, the walls of which sockets extend on opposite sides of the band, said clips having transverse holes intersecting said sockets and extending through the walls thereof, hardened rivets fitting the transverse holes of said clips and constituting therewith mating dies for forming openings in the band and securing the clips thereto, and a bolt for connecting said clips, substantially as described.

6. A band-fastener clip having an inclosed band-receiving socket and provided with transverse holes extending through the clip and intersecting the opposite edges of said socket to receive hardened rivets for punching notches in the edges of the band and securing the clip thereto, substantially as described.

7. A band-fastener comprising a pair of clips, a bolt for connecting the same, said clips having longitudinally-extending, sockets for receiving the ends of flat, wrought metal bands, the walls of which sockets extend on opposite sides of the band, each of said clips having transverse holes intersecting the opposite edges of said sockets and extending through the opposite walls thereof and hardened rivets fitting the holes of said clips and constituting therewith mating dies for forming notches in the opposite edges of the bands and securing the clips thereto, substantially as described.

8. A band-fastener clip having a bolt-receiving, perforated lug and provided with a longitudinally-extending socket for receiving the end of the band and transverse holes for fastener rivets intersecting said socket, said clip having a pair of lugs on its underside for engaging the opposite edges of a short band section, substantially as described.

FRANK C. STUCKEL.

Witnesses:
A. FREDERICK ERICKSON,
ELMER ELSWORTH GITTINS.